June 10, 1952 D. A. PARK 2,600,260
ULTRAHIGH-FREQUENCY PANORAMIC RECEIVER
Filed April 30, 1946
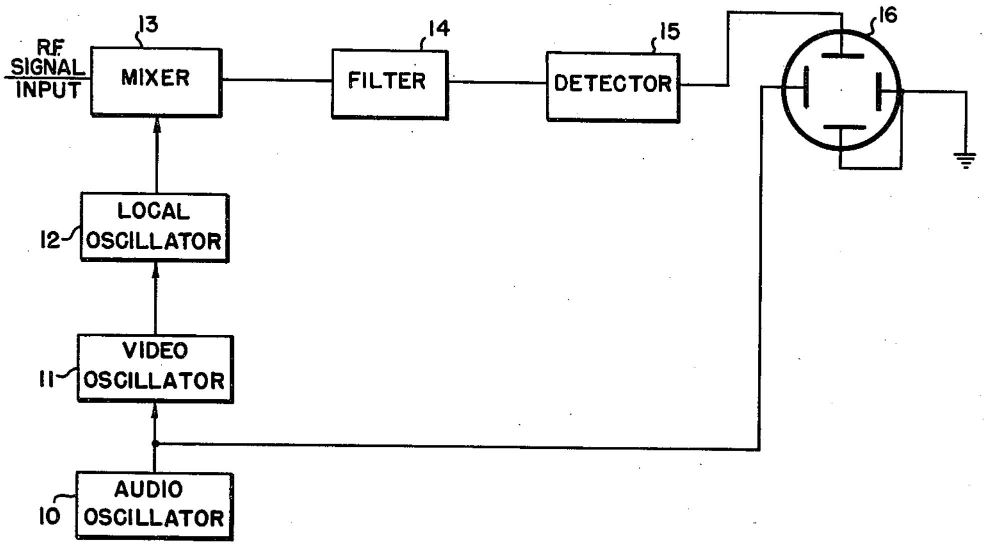
INVENTOR.
DAVID A. PARK
BY
William D. Hall
ATTORNEY Patented June 10, 1952

2,600,260

UNITED STATES PATENT OFFICE 2,600,260

ULTRAHIGH-FREQUENCY PANORAMIC RECEIVER

David A. Park, Washington, D. C., assignor to the United States of America as represented by the Secretary of War Application April 30, 1946, Serial No. 666,004

1 Claim. (Cl. 250—20)

This invention relates in general to electrical apparatus and in particular to ultra-high frequency spectrum analyzers.

The invention is particularly useful for analysis of received signal pulses or non-sinusoidal signals. The presence and amplitude of the frequency components therein are readily detected and determined by the frequency spectrum analyzer here described. In prior art spectrum analyzers utilizing the heterodyne principle of beating a locally generated signal with a received signal to derive lower-frequency signals corresponding to received signal components, there have been employed mechanical means of sweeping, or tuning, the local signal generator over a desired frequency range. Such a method of sweeping a beating signal is cumbersome and in general not as satisfactory as the electronic means here described.

It is an object of this invention to provide an ultra-high-frequency spectrum analyzer employing electronic means for producing and varying the frequency of a locally generated signal.

Other objects, features and advantages of this invention will suggest themselves to those skilled in the art and will be apparent from the following description of the invention taken in connection with the accompanying drawing.

The single figure of the drawing illustrates in block diagram from the circuit embodying the invention.

Referring now to the drawing, the portion of the circuit employed to produce a varying frequency signal which is beat with the received signal, or signal to be analyzed, comprises an audio frequency oscillator 10 which causes frequency modulation of a video frequency oscillator 11, which in turn amplitude-modulates an ultra-high-frequency local oscillator 12. The audio oscillator 10 preferably provides a fixed frequency output voltage having a substantially sawtooth wave form. The sawtooth voltage applied to video oscillator 11 causes its frequency to vary over a band corresponding to the range over which it is desired to examine the received ultra-high-frequency signals. The output of the amplitude-modulated oscillator 12 is combined in a mixer 13 with the received signal which is to be analyzed. Certain components of the output of mixer 13 are passed through a band pass filter 14 to a detector 15, and thence to the vertical deflection plates of a cathode ray oscilloscope 16. The output of audio oscillator 10 is also applied to the horizontal deflection plates of the oscilloscope to provide a synchronized horizontal sweep.

In operation, the audio oscillator 10 frequency-modulates the video oscillator 11. At a particular instant when the audio oscillator 10 causes the video oscillator 11 to generate a frequency $f_1$, the output of local oscillator 12 includes its carrier frequency $f_0$ and the side-band frequencies $(f_0-f_1)$ and $(f_0+f_1)$ which are produced by amplitude-modulation of the local oscillator. The frequencies $f_0$ $(f_0+f_1)$ and $(f_0-f_1)$ are combined in mixer 13 with the frequencies making up the received signal also applied to mixer 13, and the resultant sum and difference frequencies are applied to filter 14. The carrier frequency $f_0$ of local oscillator 12 is far enough removed from the spectrum to be analyzed so that it does not beat with them to produce any frequencies that will pass through filter 14. The filter 14 has a band pass characteristic which allows only a relatively narrow band of signals to pass through and be applied to detector 15.

As an example of the manner in which a received signal component is selected at any given instant, it may be assumed that the center frequency of the narrow band which is passed by filter 14 is equal to $f_s+(f_0+f_1)$. Then at the instant chosen in this example (the instant at which the frequency of video oscillator 11 is $f_1$), the input signal component presented on the indicator 16 is $f_s$. Thus it will be seen that as the audio oscillator 10 shifts the frequency of oscillator 11 to other frequencies, for example to a frequency $f_2$, the utilized side band frequency of oscillator 12 becomes $(f_0+f_2)$, and the filter 14 passes a signal if the signal being analyzed contains a component of frequency $f_s'$, where $f'_s+(f_0+f_2)$ is equal to $f_s+(f_0+f_1)$, the band pass center frequency.

The sawtooth output voltage from oscillator 10 also causes a horizontal sweep on the cathode ray oscilloscope 16, in which the beam or spot movement is a linear function of time. At such instants in each cycle of the sawtooth output voltage that the sum of the frequency of a selected side band from the local oscillator 12, e. g. $(f_0+f_1)$, and a component of the signal being analyzed, e. g. $f_s$, is equal to the band pass center frequency of filter 14, there is produced on indicator 16 a vertical deflection. Because the spot movement producing the horizontal reference trace on the indicator is a linear function of time, as is the variation in the frequency of the side-band, produced in local oscillator 12, and utilized in mixer 13 and filter 14, the horizontal position of vertical deflections of the trace are indicative of the frequency components present in the analyzed signal. Furthermore, the relative amplitudes of the vertical deflections on the screen of indicator 16 are indicative of the relative amplitudes of the components present in the analyzed signal.

While there has been described what is at present considered to be the preferred embodiment of the invention, it will be obvious to those skilled in the art that various changes and modifications may be made therein without departing from the scope and spirit of the invention as set forth in the appended claim.

What is claimed is:

An electronic apparatus for determining the frequency spectrum of a received non-sinusoidally modulated ultra-high frequency signal, wherein the width of said frequency spectrum is small relative to said ultra-high frequency, comprising means for generating a local signal whose frequency varies cyclically between preselected limits, said means including an audio-frequency signal source, a video-frequency oscillator means including means for applying said audio-frequency signal thereto to produce a video signal cyclically varying in frequency over a range equal to the frequency difference between said preselected limits, said frequency difference being small relative to the mean frequency of said video-frequency oscillator, a local ultra-high frequency oscillator amplitude-modulated directly by said video signal to produce said local signal, mixer means to which said local signal is directly applied for heterodyning said received and said local signals, a detector, filter means interconnecting said detector and mixer means and passing to said detector a signal having a fixed predetermined frequency lying within one of the sidebands of said mixer means output, and a cathode ray tube indicator means for presenting output signals of said detector against a reference trace produced in synchronism with said audio-frequency signal.

DAVID A. PARK.

REFERENCES CITED

The following references are of record in the file of this patent:

UNITED STATES PATENTS

| Number | Name | Date |
|---|---|---|
| 2,270,023 | Ramsay et al. | Jan. 13, 1942 |
| 2,378,604 | Wallace | June 19, 1945 |
| 2,414,096 | Dimond | Jan. 14, 1947 |